United States Patent [19]
Pruett et al.

[11] Patent Number: 5,459,224
[45] Date of Patent: Oct. 17, 1995

[54] COPOLYESTERS HAVING IMPROVED WEATHERABILITY

[75] Inventors: Wayne P. Pruett, Kingsport; Samuel D. Hilbert, Jonesborough; Max A. Weaver; Louis T. Germinario, both of Kingsport, all of Tenn.

[73] Assignee: Eastman Chemical Company, Kingsport, Tenn.

[21] Appl. No.: 276,579

[22] Filed: Jul. 18, 1994

[51] Int. Cl.$^6$ .................................................. C08G 63/00
[52] U.S. Cl. ............................................ 528/192; 528/190
[58] Field of Search ................................... 528/190, 192

[56] References Cited

U.S. PATENT DOCUMENTS

| | | | |
|---|---|---|---|
| 4,338,247 | 7/1982 | Zannucci et al. | 528/307 |
| 4,340,718 | 7/1982 | Zannucci et al. | 528/128 |
| 4,617,374 | 10/1986 | Pruett et al. | 528/288 |
| 4,707,537 | 11/1987 | Pruett et al. | 528/288 |
| 4,749,773 | 6/1988 | Weaver et al. | 528/288 |
| 4,749,774 | 6/1988 | Weaver et al. | 528/288 |
| 4,791,188 | 12/1988 | Weaver et al. | 528/288 |
| 4,826,903 | 5/1989 | Weaver et al. | 524/205 |
| 4,845,187 | 7/1989 | Weaver et al. | 528/288 |

FOREIGN PATENT DOCUMENTS 3122128  5/1991  Japan.

OTHER PUBLICATIONS

Journal of Polymer Science, Part A, vol. I, pp. 2741–2752 (1963), Stephenson et al.
Journal of Polymer Science, Part A–1, vol. 5, pp. 481–501 (1967), Marcotte et al.
Journal of Polymer Science, Part A–1, vol. 8, pp. 2703–2711 (1970), Campbell et al.
Journal of Applied Polymer Science, vol. 21, pp. 2745–2768 (1977), Merrill et al.
Journal of Applied Polymer Science, vol. 24, pp. 1809–1830 (1979), Cheung et al.
Journal of Polymer Science, vol. 38, pp. 357–367 (1959), Osborn.
Journal of Polymer Science, vol. 55, pp. 451–464 (1961), Stephenson et al.
Journal of Polymer Science, Polymer Letters, vol. 7, pp. 7–9 (1969), Pacifici et al.
Plastics Additives Handbook, c 1987, pp. 128–135.
Textile Research Journal, 01/71, Part I, pp. 32–43, Wall et al.
Die Angewandte Makromolekulare Chemie 13 (1970), pp. 97–107 (Nr. 184), Valk et al.
Rev. Prog. Coloration, vol. 16, 1986, pp. 1–15, Milligan.
Kobunshi Kagaku, vol. 22, 1965, pp. 435–440.

Primary Examiner—James J. Seidleck
Assistant Examiner—Terressa M. Mosley
Attorney, Agent, or Firm—Karen A. Harding; Harry J. Gwinnell

[57] ABSTRACT

The present invention provides a copolyester having improved weatherability and photostability. The copolyester is useful for producing fibers useful for automobile interior, draperies, outdoor awning, and for polyester sheeting for applications such as glazing, window-well covers, signs, skylights, etc.

13 Claims, No Drawings

COPOLYESTERS HAVING IMPROVED WEATHERABILITY

FIELD OF THE INVENTION

This invention belongs to the field of polyester chemistry. In particular, it relates to a copolyester comprised of residues of 2,6-naphthalene dicarboxylate and 4-oxybenzylidene having improved weatherability.

BACKGROUND OF THE INVENTION

Although polyesters in general and poly(ethylene terephthalate) in particular have fairly good stability towards sunlight, long term exposure to sunlight results in a loss of desirable physical properties, for example when tested for embrittlement, yellowing, tensile strength, impact strength, flexural strength, gloss, and solution viscosity.

It is well known that organic polymers can be rendered resistant to degradation by ultraviolet (UV) light by physically blending such polymers with various UV light absorbing compounds such as benzophenones, benzotriazoles, resorcinol monobenzoates and certain 4-oxybenzylidene compounds. The admixed UV absorbers have the disadvantage of having a tendency to sublime under high temperature processing conditions, thus resulting in the loss of the UV absorber and contamination of processing equipment. Also, the UV absorbers may be extractable or may exude from the polyesters under certain conditions.

It is known that some improvement in photostability and weatherability can be achieved by replacing some of the terephthalate residues by 2,6-naphthalene dicarboxylate residues. (See, for example, B. Milligan, *Rev. Prog. Coloration*, Vol. 16, 1986, pp. 1–17; and P.S.R. Cheung, et al., *J. Appl. Polym. Sci.*, 2.4, 1809 (1979). It is also known that the incorporation of certain 4-oxybenzylidene moieties into polyesters improves weatherability and photostability. (See, for example, U.S. Pat. Nos. 4,338,247 and 4,340,718.) The present invention, as described below, provides a copolyester comprised of both 2,6-naphthalene dicarboxylic acid and 4-oxybenzylidene moieties having improved weatherability.

SUMMARY OF THE INVENTION

This invention provides copolyesters having residues of 2,6-naphthalene dicarboxylic acid and residues of compounds having 4-oxybenzylidene moieties copolymerized therein. Such copolyesters exhibit superior weatherability and photostability.

DETAILED DESCRIPTION OF THE INVENTION

The present invention provides a copolyester comprised of from about 0.5 to 10.0 mole percent of residues of Formula (I):

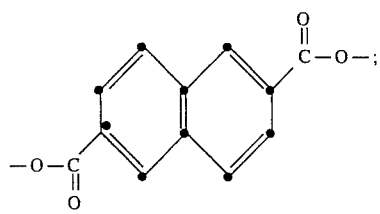

and about 0.1 to 5.0 weight percent of a residue having a moiety of Formula (II):

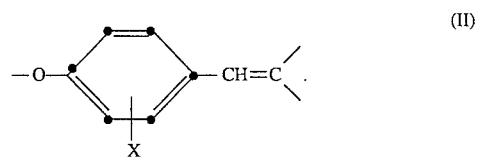

wherein X is selected from the group consisting of hydrogen, hydroxy, $C_1$–$C_4$ alkyl, $C_1$–$C_4$ alkoxy and halo.

In a preferred embodiment of the present invention, the residue of Formula (I) is present in a concentration of about 2.0 to 7 mole percent and the residue of Formula (II) is present in a concentration of about 0.3 to 3.0 weight percent. Preferred compounds having a moiety of Formula (II) include the following:

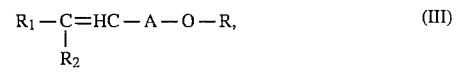

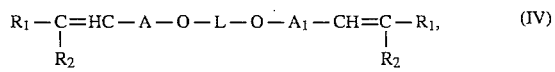

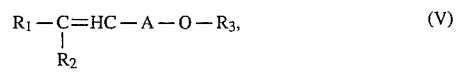

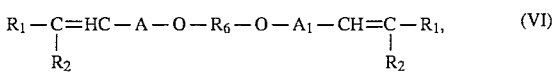

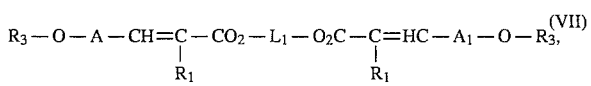

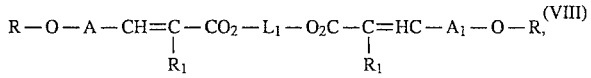

and

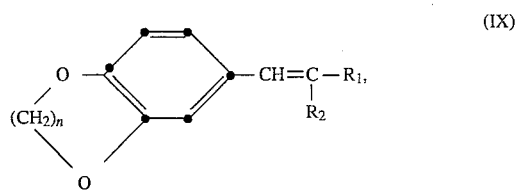

wherein R is selected from the group consisting of hydrogen; $C_1$–$C_{12}$ alkyl; aryl $C_3$–$C_8$ cycloalkyl; $C_3$–$C_8$ alkenyl; $C_3$–$C_8$ alkynyl; $C_1$–$C_{12}$ substituted 1–3 times with a group selected from the group consisting of hydroxy, halo, carboxy, cyano, $C_1$–$C_4$ alkoxy, aryl, $C_1$–$C_4$ alkylthio, arylthio, aryloxy, $C_1$–$C_4$ alkoxycarbonyl, $C_1$–$C_4$ alkanoyloxy, $C_3$–$C_8$ cycloalkyloxy, carbamoyl, sulfamyl, hydroxy—$C_1$–$C_4$ alkoxy, hydroxy—$C_1$–$C_4$ alkylthio, $C_1$–$C_{12}$ alkylthio, $C_1$–$C_4$ alkanoylamino, aroylamino, $C_1$–$C_{12}$ alkylsulfonamido, arylsulfonamido, succiminido and phthalimido;

$R_1$ is selected from the group consisting of cyano; carboxy; $C_3$–$C_8$ alkenyloxycarbonyl; $C_1$–$C_{12}$ alkoxycarbonyl; $C_3$–$C_8$ cycloalkoxycarbonyl; and aryloxycarbonyl;

$R_2$ is as defined for $R_1$ or is selected from the group consisting of carbamoyl; $C_1$–$C_4$ alkanoyl, $C_3$–$C_8$ cycloalkanoyl, aroyl; $C_1$–$C_{12}$ alkylsulfonyl; $C_3$–$C_8$ cycloalkylsulfonyl; arylsulfonyl, aryl and heteroaryl;

$R_3$ is selected from groups of the formulae —$COR_4$; —$CO_2R_4$; —$CON(R_5)R_4$; $C_1$–$C_{12}$ alkylsulfonyl; and arylsulfonyl; wherein $R_4$ is selected from the group consisting of hydrogen; $C_3$–$C_8$ alkenyl; $C_1$–$C_{12}$ alkyl; $C_3$–$C_8$ cycloalkyl; aryl; and heteroaryl;

$R_5$ is selected from the group consisting of hydrogen; $C_1$–$C_{12}$ alkyl; and $C_1$–$C_{12}$ alkyl substituted 1–3 times with a group selected from the group consisting of hydroxy, halo, carboxy, cyano, $C_1$–$C_4$ alkoxy, aryl, $C_1$–$C_4$ alkylthio, arylthio, aryloxy, $C_1$–$C_4$ alkoxycarbonyl, $C_1$–$C_4$ alkanoyloxy, $C_3$–$C_8$ cycloalkyloxy carbamoyl, sulfamyl, hydroxy—$C_1$–$C_4$ alkoxy, hydroxy—$C_1$–$C_4$ alkylthio, $C_1$–$C_{12}$ alkylthio, $C_1$–$C_4$ alkanoylamino, aroylamino, $C_1$–$C_{12}$ alkylsulfonamido, arylsulfonamido, succiminido and phthalimido;

$R_6$ is selected from the group consisting of

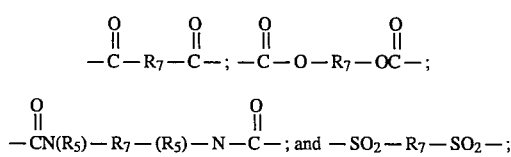

wherein $R_7$ is selected from the group consisting of $C_1$–$C_{12}$ alkylene; arylene; $C_3$–$C_8$ cycloalkylene; and $R_5$ is as defined above;

L and $L_1$ are divalent organic linking groups bonded by non-oxo carbon atoms;

A and $A_1$ are independently 1,4-phenylene and 1,4-phenylene substituted with a group selected from the group consisting of hydroxy, halo, $C_1$–$C_4$ alkyl, and $C_1$–$C_4$ alkoxy.

n is one or two; with the proviso that at least one polyester reactive group is present on each of the compounds of Formula (I) and (II).

Further preferred 4-oxybenzylidene compounds include the following:

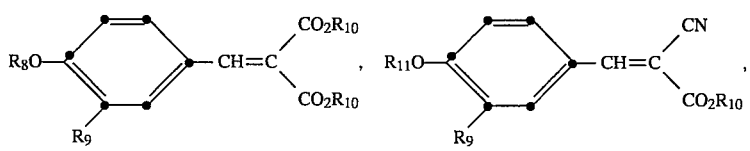

and

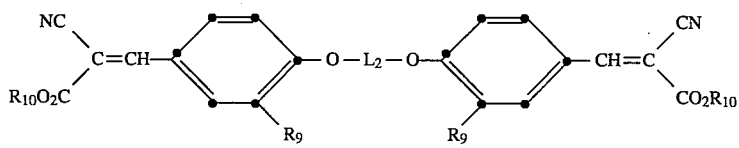

wherein $R_8$ is selected from the group consisting of hydrogen; $C_1$–$C_4$ alkyl; benzyl; $C_3$–$C_8$ cycloalkyl; phenyl; and naphthyl;

$R_9$ is hydrogen or $C_1$–$C_4$ alkoxy;

$R_{10}$ is selected from the group consisting of $C_1$–$C_4$ alkyl and $C_1$–$C_4$ alkyl substituted with 1–2 groups selected from the group consisting of hydroxy, $C_1$–$C_4$ alkoxy, halogen, cyano, and phenyl;

$R_{11}$ is selected from the group consisting of hydrogen; $C_1$–$C_4$ alkyl; $C_1$–$C_4$ alkyl substituted 1 or 2 times with a group selected from the group consisting of hydroxy, $C_1$–$C_4$ alkanoyloxy, and $C_1$–$C_4$ alkoxycarbonyl; phenyl; and naphthyl; and $L_2$ is a $C_2$–$C_8$ alkylene radical; with the proviso that two polyester reactive groups are present.

In the above formulae, the terms "$C_3$–$C_8$ alkenyl" and "$C_3$–$C_8$ alkynyl" refer to $C_3$–$C_8$ hydrocarbon groups containing at least one double or triple bond, respectively.

The terms "aryl" and "aroyl" as used herein preferably denotes a group wherein the aromatic portion is a phenyl or naphthyl group, optionally substituted one to three times with a group selected from the group consisting of $C_1$–$C_{12}$ alkyl, $C_1$–$C_{12}$ alkoxy, halo, trifluromethyl, $C_1$–$C_4$ alkoxycarbonyl, $C_1$–$C_4$ alkanoyloxy, hydroxy, carbamoyl, sulfamyl, nitro, cyano, $C_1$–$C_4$ alkylsulfonylamino, and phenylsulfonylamino.

The term "heteroaryl" is used herein to represent mono or bicyclic hetero aromatic radicals containing at least one "hetero" atom selected from oxygen, sulfur and nitrogen, or a combination of these atoms, in combination with carbon atoms to complete the aromatic ring. Examples of suitable heteroaryl groups include: thiazolyl, benzothiazolyl, pyrazolyl, pyrrolyl, thienyl, furyl, thiadiazolyl, oxadiazolyl, benzoxazolyl, benzimidazolyl, pyridyl, pyrimidinyl and triazolyl and such groups substituted 1–3 times with a group selected from the group consisting of hydroxy, halo, carboxy, cyano, $C_1$–$C_4$ alkoxy, phenyl, $C_1$–$C_4$ alkylthio, phenylthio, phenyloxy, $C_1$–$C_4$ alkoxycarbonyl; $C_1$–$C_4$ alkanoyloxy, $C_3$–$C_8$ cycloalkyloxy carbamoyl, sulfamyl, hydroxy—$C_1$–$C_4$ alkoxy, hydroxy—$C_1$–$C_4$ alkylthio, $C_1$–$C_{12}$ alkylthio, $C_1$–$C_4$ alkanoylamino, benzoylamino, $C_1$–$C_{12}$ alkylsulfonamido, phenylsulfonamido, succiminido and phthalimido;

The term "arylene" as used herein preferably denotes a divalent phenylene and naphthalene, optionally substituted by a group selected from the group consisting of $C_1$–$C_4$ alkyl, $C_1$–$C_4$ alkoxy, hydroxy, and halo.

The term "carbamoyl" as used herein denotes a group of the formula —$CON(R_{12})R_{13}$, wherein $R_{12}$ and $R_{12}$ are independently selected from the group consisting of hydrogen; $C_1$–$C_{12}$ alkyl; $C_3$–$C_8$ alkenyl; $C_3$–$C_8$ alkynyl; aryl; heteroaryl; and $C_1$–$C_{12}$ alkyl substituted 1–3 times with a group selected from the group consisting of hydroxy, halo, carboxy, cyano, $C_1$–$C_{41}$alkoxy, aryl, $C_1$–$C_4$ alkylthio, phenylthio, phenyloxy, $C_1$–$C_4$ alkoxycarbonyl, $C_1$–$C_4$ alkanoyloxy, $C_3$–$C_8$ cycloalkyloxy carbamoyl, sulfamyl, hydroxy—$C_1$–$C_4$ alkoxy, hydroxy—$C_1$–$C_4$ alkylthio, $C_1$–$C_{12}$ alkylthio, $C_1$–$C_4$ alkanoylamino, aroylamino, $C_1$–$C_{12}$ alkylsulfonamido, aroylsulfonamido, succinimido and phthalimido.

The term "halo" refers to bromo, chloro, fluoro, and iodo.
The term "sulfamyl" denotes a group of the formula —$SO_2(R_{12})R_{13}$, wherein $R_{12}$ and $R_{13}$ are as defined above.

The term "alkylene" refers to a divalent $C_1$–$C_{12}$ aliphatic hydrocarbon moiety, either straight or branched-chain and such alkylene moieties substituted with groups such as hydroxy, halogen, $C_1$–$C_4$ alkoxy, aryl, $C_1$–$C_4$ alkanoyloxy and $C_1$–$C_4$ alkoxycarbonyl.

The above divalent linking groups L and $L_1$ can be selected from a wide variety of $C_1$–$C_{12}$ alkylene, $C_3$–$C_{12}$ alkenylene, $C_3$–$C_{12}$ alkynylene, $C_3$–$C_7$ cycloalkylene, carbocyclic and heterocyclic arylene and combinations of such divalent groups. The alkylene linking groups may contain within their main chain hetero atoms, e.g., oxygen, sulfur, sulfonyl, nitrogen, substituted nitrogen, and/or cyclic groups such as cycloalkylene, carbocyclic arylene, divalent aromatic heterocyclic groups or ester moieties such as:

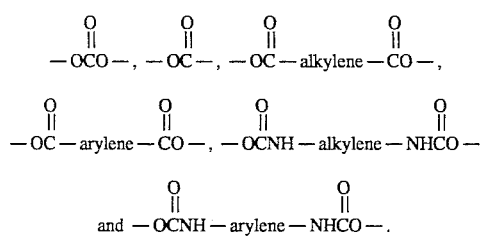

Examples of alkylene linking groups containing a cyclic moiety in the linking chain include:

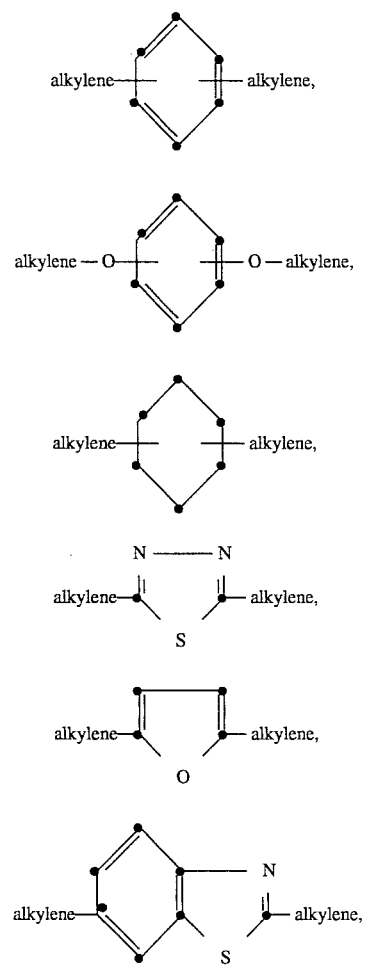

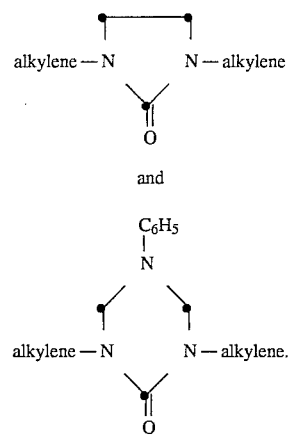

The carbocyclic groups may be cycloalkylene such as 1,2-, 1,3- and 1,4-cyclohexylene, 1,2-, 1,3- and 1,4-phenylene and 2,6- and 2,7-naphthylene- Examples of the divalent heterocyclic groups include unsubstituted and substituted triazines such as 1,3,5-triazin-2,4-diyl, 6-methoxy-1,3,5-triazin-2,4-diyl and the group having the structure:

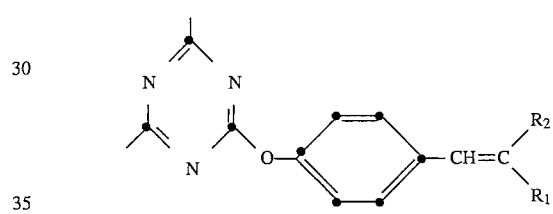

wherein $R_1$ and $R_2$ are defined hereinabove; diazines such as 2,4-pyrimidindiyl, 6-methyl-2,4-pyrimidindiyl, 6-phenyl-2,4-pyrimidindiyl, 3,6-pyridazindiyl and 2-methyl-3-oxo-4,5-pyridazindiyl; dicyanopyridines such as 3,5-dicyano-2,6-pyridindiyl; quinolines and isoquinolines such as 2,4-quinolindiyl and 2,8-isoquinolinediyl; quinoxalines such as 2,3-quinoxalindiyl; and azoles such as 2,5-thiazoldiyl, 5-methylene-2thiazolyl, 3,5-isothiazoldiyl, 5-methylene-3-isothiazolyl, 1,3,4-thiadiazol-2,5-diyl, 1,2,4-thiadiazol-3,5-diyl, 2,6-benzothiazoldiyl, 2,5-benzoxazoldiyl, 2,6-benzimidazoldiyl, 6-methylene-2-benzo-thiazolyl and the group having the structure:

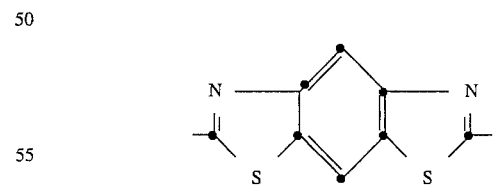

and maleimides such as 1-methyl-3,4-maleimidediyl and 1-phenyl-3,4-maleimidediyl. The acyclic moieties of the linking group represented by L and $L_1$ also may be substituted, for example, with hydroxy, $C_1$–$C_4$ alkoxy, halogen, $C_1$–$C_4$ alkanoyloxy, cyano, $C_1$–$C_4$ alkoxycarbonyl, aryl, aryloxy, and cycloalkyl. The cyclic moieties of linking group L and $L_1$ may be substituted with alkyl as well as with the substituents already mentioned. In addition to the possible substitution described above, the nitrogen atom of the nitrogen containing alkylene groups may be substituted, for example, with $C_1$–$C_4$ alkyl, aryl, $C_1$–$C_4$ alkanoyl, aroyl, $C_1$–$C_4$ alkylsulfonyl, or carbamoyl, e.g.,

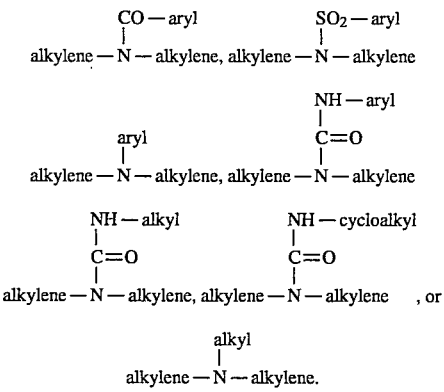

In the practice of the invention, compounds III–IX, above, are reacted or copolymerized in combination with 2,6-naphthalene dicarboxylic acid (or an ester thereof) and must bear or contain at least one substituent that is reactive with one of the monomers from which the condensation polymer is derived. Examples of such reactive substituents include carbonyl halides such as carbonyl chloride, carboxy, $C_1$–$C_4$ alkoxycarbonyl, $C_3$–$C_8$ alkenyloxycarbonyl, $C_3$–$C_8$ cycloalkoxycarbonyl, aryloxycarbonyl, hydroxy, esterified hydroxy, i.e., acyloxy, groups such as carboxylic acid esters, e.g., $C_1$–$C_4$ alkanoyloxy, $C_3$–$C_8$ cycloalkanoyloxy and aroyloxy; carbamic acid esters, e.g., N—$C_1$—$C_4$ alkylcarbamoyloxy and N—aryl- carbamoyloxy and carbonate esters, e.g., ethoxycarbonyloxy.

As those skilled in the art will appreciate, when the reactive substituent or substituents are $C_1$–$C_4$ alkoxycarbonyl, $C_3$–$C_8$ alkenyloxycarbonyl, $C_3$–$C_8$ cycloalkoxycarbonyl, aryloxycarbonyl, or $C_1$–$C_4$ alkanoyloxy, the $C_1$–$C_4$ alkyl, $C_3$–$C_8$ alkenyl, $C_3$–$C_8$ cycloalkyl and aryl residues and the acid residues of the lower alkanoyloxy substituents are displaced or removed from the compound upon reaction with the polymer or polymer precursor.

Also, as will further be appreciated by those skilled in the art, when only one reactive group is present in the 4-oxybenzylidene UV light absorbing compound the reactive compound serves as a chain terminator, while two reactive groups promote chain propagation to give copolymerization and incorporation of the UV light absorbing moiety in the polymer chain; thus it is preferred that two reactive groups be present. When three or more reactive groups are present crosslinking occurs during the polyester preparation. Depending on the end use contemplated, it may or may not be desired that the reactive UV absorber functions as a chain terminator or crosslinking agent, particularly when lower concentrations are required to produce the desired level of stabilization.

The 2,6-naphthalene dicarboxylate residues are preferably incorporated in the polyester by adding either 2,6-naphthalene dicarboxylic acid or the $C_1$–$C_6$ alkyl mono or di-esters during the polymerization reaction.

The polyesters which may be used in the preparation of the compositions of our invention include linear, thermoplastic, crystalline or amorphous polyesters produced by conventional polymerization of 1) one or more diols, 2) one or more aliphatic, alicyclic, or aromatic dicarboxylic acid (or esters), with provision that at 2,6-naphthalene dicarboxylic acids (or esters) make up from about 0.5 to about 10.0 mole percent of the diacid (or ester) component, and 3) an amount of a 4-oxybenzylidene compound of Formulae III–IX to produce a final polyester composition such that the weight percent of the copolymerized 4-oxybenzylidene compound is from about 0.1 to about 5.0.

The preferred polyesters are comprised of at least about 50 mole percent terephthalic acid residues and at least about 50 mole percent ethylene glycol and/or 1,4-cyclohexonedimethanol residues. The preferred mole percent of diacid (or ester) comprised of 2,6-naphthalene dicarboxylic acid (or ester) is about 2.0 to about 7.5. The preferred weight percent of the reacted 4-oxybenzylidene UV light absorber is the final polymer composition is from about 0.3 to about 2.0 weight percent.

The preferred polyesters of the invention are thermoplastic molding or fiber grade having an inherent viscosity I.V. of about 0.4 to about 1.2 dL/g when measured in a 60/40 ratio by weight of phenol/tetrachloroethene at a concentration of 0.5 g per 100 mL.

The polyesters referred to herein include linear, thermoplastic, crystalline or amorphous polyesters produced by conventional polymerization techniques from one or more diols and one or more dicarboxylic acids. The polyesters are preferably molding or fiber grade.

Suitable diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

Suitable acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The linear polyesters may be prepared according to polyester forming conditions well known in the art. For example, a mixture of one or more dicarboxylic acids, preferably aromatic dicarboxylic acids, or ester forming derivatives thereof, and one or more diols may be heated in the presence of esterification and/or polyesterification catalysts at temperatures in the range of about 150° to about 300° C. and pressures of atmospheric to about 0.2 mm Hg. Normally, the dicarboxylic acid or derivative thereof is esterified or trans-esterified with the diol(s) at atmospheric pressure and at a temperature at the lower end of the specified range. Polycondensation then is effected by increasing the temperature and lowering the pressure while excess diol is removed from the mixture.

Typical catalyst or catalyst systems for polyester condensation are well-known in the art. For example, catalysts disclosed in U.S. Pat. Nos. 4,025,492; 4,136,089; 4,176,224; 4,238,593; and 4,208,527, incorporated herein by reference, are deemed suitable in this regard. Further, R. E. Wilfong, *Journal of Polymer Science,* 54 385 (1961) sets forth typical catalysts which are useful in polyester condensation reactions. A preferred catalyst system is Mn/Ti/Co/P.

A preferred temperature range for a polyester condensation is about 260° C. to about 300° C.

The copolyester compositions provided herein are useful in the manufacturing of containers or packages for comestibles such as beverages and food. By the use of known heat-setting techniques, certain of the polyesters are, in terms of color, I.V. and heat distortion, stable at temperatures up to about 100° C. Such stability characteristics are referred to herein as "hot-fill" stability. Articles molded from these polyesters exhibit good thin-wall rigidity, excellent clarity and good barrier properties with respect to moisture and atmospheric gases, particularly carbon dioxide and oxygen.

The copolyesters most preferred for use in articles having "hot-fill" stability comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate), wherein the polyesters have been sufficiently heat set and oriented by methods well known in the art to give a desired degree of crystallinity. By definition, a polymer is "hot-fill" stable at a prescribed temperature when less than 2% change in volume of a container manufactured therefrom occurs upon filling the same with a liquid at the temperature. For the manufacture of blow-molding beverage bottles, the most preferred polyesters have an I.V. of 0.65 to 0.85, and a Tg of >70° C., and film sections cut from the bottle have a Water Vapor Transmission Rate of 1.5 to 2.5 g mils/100 in.$^2$-24 hours, a Carbon Dioxide Permeability of 20 to 30 cc. mils/100 in.$^2$-24 hours-atm., and an Oxygen Permeability of 4 to 8 cc. mils/100 in.$^2$-24 hours-atm. The Tg is determined by Differential Scanning Calorimetry at a scan rate of 20 Centigrade Degrees/min., the Oxygen Permeability by the standard operating procedure of a MOCON OXTRAN 100 instrument of Modern Controls, Inc., of Elk River, Minn., and the Carbon Dioxide Permeability by the standard operating procedure of a MOCON PERMATRAN C II, also of Modern Controls.

Experimental Section
Example 1 - Polyester Containing both Naphthalene-2,6-Dicarboxylate and 4-Oxybenzylidene Residues The following materials were placed in a 500 mL three-necked, round bottom flask:

| | |
|---|---|
| 92.15 g | (0.475 mole) dimethyl terephthalate |
| 6.1 g | (0.025 mole) dimethyl naphthalene 2,6-dicarboxylate (5.0 mole % of total diacid ester reactant) |
| 52.1 g | (0.84 mole) ethylene glycol |
| 23.0 g | (0.16 mole) cyclohexane - 1,4-dimethanol |
| 0.00670 g | Ti from a n-butanol solution of acetyl - triisopropyl titanate |
| 0.00604 g | Mn from an ethylene glycol solution of manganese acetate |
| 0.00550 g | Co from an ethylene glycol solution of cobaltous acetate |

The flask was equipped with a nitrogen inlet, stirrer, vacuum outlet, and condensing flask. The flask and contents were heated at about 200° C. in a Belmont metal bath for 1 hour and then at about 225° C. for about minutes with a nitrogen sweep over the reaction mixture. Then 1.11 mL of an ethylene glycol slurry of a mixed phosphorous ester composition (ZONYL A) which contained about 0.00880 g phosphorus was added in addition to 1.11 g of the 4-oxybenzylidine UV light absorber ethyl 2-cyano-3-(4-hydroxyphenyl) propenoate. The temperature of the bath was increased to about 275° C. over about 30 minutes with a slow stream of nitrogen bleeding in the system. Vacuum was applied, the pressure reduced to about 0.15 mmHg, and the polycondensation reaction completed by heating at about 275° C. for 1.0 hours.

After being removed from the metal bath, the flask was allowed to cool in a nitrogen atmosphere while the polymer solidified.

The resulting polymer, which contained about 1.0% by weight of the 4-oxybenzylidene UV light absorber and 5.0 mole percent of naphthalene-2,6-dicarboxylate residues, was mechanically ground using a Wiley mill to a particle size of 2–3 mm.

The inherent viscosity of the polymer was 0.78. A portion of the polymer was injected molded into a bar (2.5"×0.5"×$\frac{1}{16}$ inches) which was tested for weatherability and photostability by exposure in an Atlas XWR Weather-Ometer for 0, 500, 1,000 and 2,000 hours by ASTM Standard Practice D1499 [Practice for Operating Light and Water Exposure Apparatus (Carbon-Arc Type) for Exposure of Plastics]. Then the flatwise impact strength was determined according to ASTM D256 Method A. Excellent weatherability was observed with the sample having maintained excellent flatwise impact strength (FWIS) after exposure to 2,000 hours of radiation (See Table 1).

Comparative Example 1

Polyester Containing Only 4-Oxybenzylidene Residues

The procedure of Example 1 was repeated exactly except that no dimethyl naphthalene-2,6-dicarboxylate was added and the amount of dimethyl terephthalate was increased to 97.0 g (0.50 mole). The polymer was tested for photostability and weatherability as described in Example 1. After exposure to 2,000 hours of radiation, the polymers showed a tremendous loss in FWIS (See Table 1).

Comparative Examples 2, 3 and 4

Polyesters Containing 2,5, 5.0 and 10.0 Mole Percent of Naphthalene 2,6-Dicarboxylate Residue, Respectively Example 1 was repeated except that no 4-oxybenzylidene UV light absorber was added and the respective amounts of dimethyl naphthalene-2,6-dicarboxylate added were 3.05 g (0.0125 mole), 6.1 g (0.025 mole) and 12.2 g (0.05 mole) with the quantities of dimethyl terephthalate added adjusted accordingly such that 0.50 mole of diacid ester was added for each polymer preparation.

The weatherability and photostability as reflected in the FWIS were determined and the results reported in Table I. All of the samples showed a major loss in strength after exposure to 2,000 hours of radiation (See Table 1).

The 4-oxybenzylidene UV light absorbing compounds which are generally useful in the practice of this invention are disclosed in the following patents:

U.S. Pat. Nos. 4,617,374, 4,707,537, 4,749,773, 4,749,774, 4,791,188, 4,826,903 and 4,845,187 incorporated herein by reference.

TABLE 1

Weatherability of Polyester Samples Containing Naphthalene-2,6-Dicarboxylate and/or 4-Oxybenzylidene Residues

| Polymer Sample | Exposure Hours[1] | Flatwise Impact Strength (ft.-lb./in.$^2$)[2] |
|---|---|---|
| Example 1 | 0 | 15.31 |
|  | 1,000 | 17.80 |
|  | 2,000 | 14.90 |
| Comparative Example 1 | 0 | 15.19 |
|  | 1,000 | 17.15 |
|  | 2,000 | 2.06 |
| Comparative Example 2 | 0 | 14.27 |
|  | 1,000 | 1.18 |
|  | 2,000 | 0.82 |
| Comparative Example 3 | 0 | 14.55 |
|  | 1,000 | 1.62 |
|  | 2,000 | 1.04 |
| Comparative Example 4 | 0 | 14.00 |
|  | 1,000 | 2.70 |
|  | 2,000 | 1.87 |

[1]Exposure in Atlas XWR Weather-Ometer (ASTM Standard D1499)
[2]Flatwise Impact Strength Determined by ASTM D 256 Method A 4.636 ft.-lb/in$^2$ = 1 joule/cm$^2$

We claim:

1. A copolyester comprised of from about 0.5 to 10.0 mole percent of residues of Formula (I)

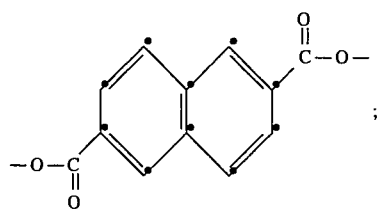
(I)

and about 0.1 to 5.0 weight percent of a residue having a moiety of Formula (II):

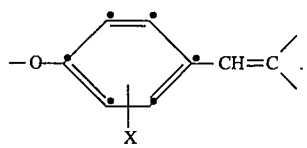
(II)

wherein X selected from the group consisting of hydrogen, hydroxy, $C_1$–$C_4$ alkyl, $C_1$–$C_4$ alkoxy and halo.

2. The copolyester of claim 1, wherein the residue of Formula (I) is present in a concentration of 2.0 to 7 mole percent and the residue having a moiety of Formula (II) is present in a concentration of 0.3 to 3.0 weight percent.

3. The copolyester of claim 1, wherein the residue having a moiety of Formula (II) is derived from a compound selected from the group consisting of $$R_1-C=HC-A-O-R, \quad (III)$$
$$\phantom{xxx}|\phantom{xxxxxxxxxxxxxx}$$
$$\phantom{xx}R_2$$

$$R_1-C=HC-A-O-L-O-A_1-CH=C-R_1, \quad (IV)$$
$$\phantom{xxx}|\phantom{xxxxxxxxxxxxxxxxxxxxxxxxxxxxxxx}|$$
$$\phantom{xx}R_2\phantom{xxxxxxxxxxxxxxxxxxxxxxxxxxxxxx}R_2$$

$$R_1-C=HC-A-O-R_3, \quad (V)$$
$$\phantom{xxx}|$$
$$\phantom{xx}R_2$$

$$R_1-C=HC-A-O-R_6-O-A_1-CH=C-R_1, \quad (VI)$$
$$\phantom{xxx}|\phantom{xxxxxxxxxxxxxxxxxxxxxxxxxxxxxxx}|$$
$$\phantom{xx}R_2\phantom{xxxxxxxxxxxxxxxxxxxxxxxxxxxxxx}R_2$$

$$R_3-O-A-CH=C-CO_2-L_1-O_2C-C=HC-A_1-O-R_3, \quad (VII)$$
$$\phantom{xxxxxxxxxxx}|\phantom{xxxxxxxxxxxxxxxxxxxxxx}|$$
$$\phantom{xxxxxxxxxx}R_1\phantom{xxxxxxxxxxxxxxxxxxxxx}R_1$$

$$R-O-A-CH=C-CO_2-L_1-O_2C-C=HC-A_1-O-R, \quad (VIII)$$
$$\phantom{xxxxxxxxx}|\phantom{xxxxxxxxxxxxxxxxxxxxxx}|$$
$$\phantom{xxxxxxxx}R_1\phantom{xxxxxxxxxxxxxxxxxxxxx}R_1$$

and

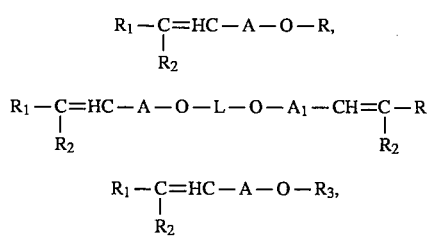
(IX)

wherein R is selected from the group consisting of hydrogen; $C_1$–$C_{12}$ alkyl; aryl $C_3$–$C_8$ cycloalkyl; $C_3$–$C_8$ alkenyl; $C_3$–$C_8$ alkynyl; and $C_1$–$C_{12}$ substituted 1–3 times with a group selected from the group consisting of hydroxy, halo, carboxy, cyano, $C_1$–$C_4$ alkoxy, aryl, $C_1$–$C_4$ alkylthio, arylthio, aryloxy, $C_1$–$C_4$ alkoxycarbonyl, $C_1$–$C_4$ alkanoyloxy, $C_3$–$C_8$ cycloalkyloxy, carbamoyl, sulfamyl, hydroxy—$C_1$–$C_4$ alkoxy, hydroxy—$C_1$–$C_4$ alkylthio, $C_1$–$C_{12}$ alkylthio, $C_1$–$C_4$ alkanoylamino, aroylamino, $C_1$–$C_{12}$ alkylsulfonamido, arylsulfonamido, succiminido and phthalimido;

$R_1$ is selected from the group consisting of cyano; carboxy; $C_3$–$C_8$ alkenyloxycarbonyl; $C_1$–$C_{12}$ alkoxycarbonyl; $C_3$–$C_8$ cycloalkoxycarbonyl; and phenyloxycarbonyl;

$R_2$ is as defined for $R_1$ or is selected from the group consisting of carbamoyl; $C_1$–$C_4$ alkanoyl, $C_3$–$C_8$ cycloalkanoyl, aroyl; $C_1$–$C_{12}$ alkylsulfonyl; $C_3$–$C_8$ cycloalkylsulfonyl; arylsulfonyl, aryl, and heteroaryl;

$R_3$ is selected from groups of the formula —$COR_4$; —$CO_2R_4$; —$CON(R_5)R_4$; $C_1$–$C_{12}$ alkylsulfonyl; and arylsulfonyl; wherein $R_4$ is selected from the group consisting of hydrogen; $C_3$–$C_8$ alkenyl; $C_1$–$C_{12}$ alkyl; $C_3$–$C_8$ cycloalkyl; aryl; and heteroaryl;

$R_5$ is selected from the group consisting of hydrogen; $C_1$–$C_{12}$ alkyl; and $C_1$–$C_{12}$ alkyl substituted 1–3 times with a group selected from the group consisting of hydroxy, halo, carboxy, cyano, $C_1$–$C_4$ alkoxy, aryl, $C_1$–$C_4$ alkylthio, arylthio, aryloxy, $C_1$–$C_4$ alkoxycarbonyl, $C_1$–$C_4$ alkanoyloxy, $C_3$–$C_8$ cycloalkyloxy carbamoyl, sulfamyl, hydroxy—$C_1$–$C_4$ alkoxy, hydroxy—$C_1$–$C_4$ alkylthio, $C_1$–$C_{12}$ alkylthio, $C_1$–$C_4$ alkanoylamino, aroylamino, $C_1$–$C_{12}$ alkylsulfonamido, arylsulfonamido, succiminido and phthalimido;

$R_6$ is selected from the group consisting of

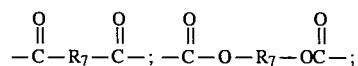

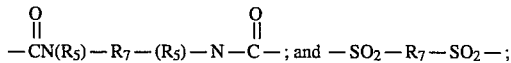

wherein $R_7$ is selected from the group consisting of $C_1$–$C_{12}$ alkylene; arylene; $C_3$–$C_8$ cycloalkylene; and $R_5$ is as defined above;

L and $L_1$ are divalent organic linking groups bonded by non-oxo carbon atoms;

A and $A_1$ are independently 1,4-phenylene and 1,4-phenylene substituted with a group selected from the group consisting of hydroxy, halo, and $C_1$–$C_4$ alkoxy; and n is one or two; with the proviso that at least one polyester reactive group is present on each of the compounds of Formula (I) and (II).

4. The copolyester of claim 3, wherein the residue having a moiety of Formula (II) is derived from a compound of the formula

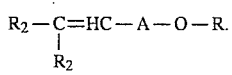

5. The copolyester of claim 3, wherein the residue having a moiety of Formula (II) is derived from a compound of the formula

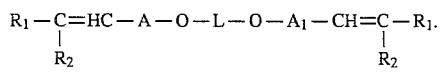

6. The copolyester of claim 3, wherein the residue having a moiety of Formula (II) is derived from a compound of the formula

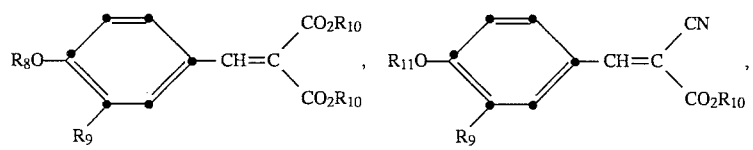

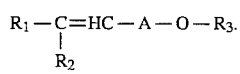

7. The copolyester of claim 3, wherein the residue having a moiety of Formula (II) is derived from a compound of the formula

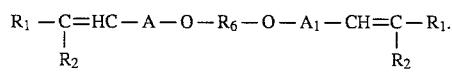

8. The copolyester of claim 3, wherein the residue having a moiety of Formula (II) is derived from a compound of the formula

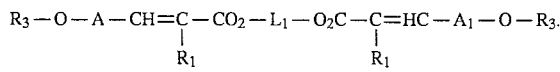

9. The copolyester of claim 3, wherein the residue having a moiety of Formula (II) is derived from a compound having the formula

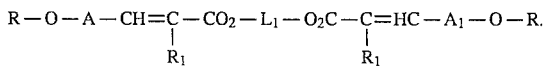

10. The copolyester of claim 3, wherein the residue having a moiety of Formula (II) is derived from a compound having the formula

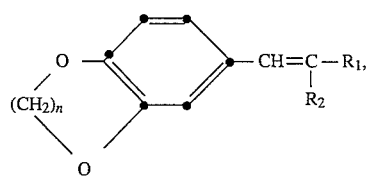

11. The copolyester of claim 3, wherein the residue having a moiety of Formula (II) is derived from a compound selected from the group consisting of

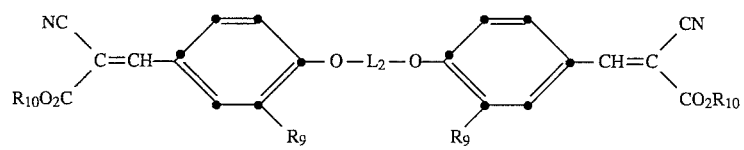

wherein $R_8$ is selected from the group consisting of hydrogen; $C_1$–$C_4$ alkyl; benzyl; $C_3$–$C_8$ cycloalkyl; phenyl; and naphthyl;

$R_9$ is hydrogen or $C_1$–$C_4$ alkoxy;

$R_{10}$ is selected from the group consisting of $C_1$–$C_4$ alkyl and $C_1$–$C_4$ alkyl substituted with 1 or 2 groups selected from the group consisting of hydroxy, $C_1$–$C_4$ alkoxy, halo, cyano, and phenyl;

$R_{11}$ is selected from the group consisting of hydrogen; $C_1$–$C_4$ alkyl; $C_1$–$C_4$ alkyl substituted 1 or 2 times with a group selected from the group consisting of hydroxy, $C_1$–$C_4$ alkanoyloxy, and $C_1$–$C_4$ alkoxycarbonyl; phenyl; and naphthyl; and $L_2$ is a $C_2$–$C_8$ alkylene radical; with the proviso that two polyester reactive groups are present.

12. The copolyester of claim 3, wherein the residue having a moiety of Formula (II) is derived from 2-cyano-3-(4-hydroxyphenyl)propionate.

13. A shaped or formed article comprised of the copolyester of claim 1.

UNITED STATES PATENT AND TRADEMARK OFFICE
CERTIFICATE OF CORRECTION

PATENT NO. : 5,459,224
DATED : October 17, 1995
INVENTOR(S) : Wayne P. Pruett, Samuel D. Hilbert, Max A. Weaver, Louis T. Germinario It is certified that error appears in the above-indentified patent and that said Letters Patent is hereby corrected as shown below:

Column 13, claim 6, the formula should read

Column 14, claim 11, the formula should read

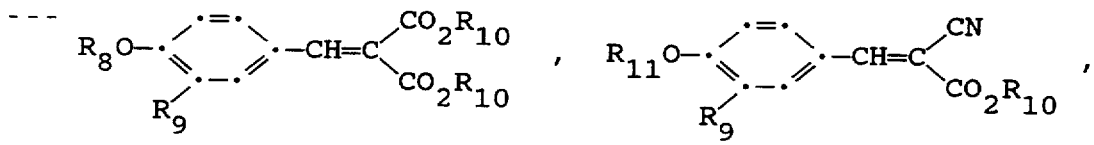

UNITED STATES PATENT AND TRADEMARK OFFICE
CERTIFICATE OF CORRECTION

PATENT NO. : 5,459,224
DATED : October 17, 1995
INVENTOR(S) : Wayne P. Pruett, et al.

It is certified that error appears in the above-indentified patent and that said Letters Patent is hereby corrected as shown below:

and

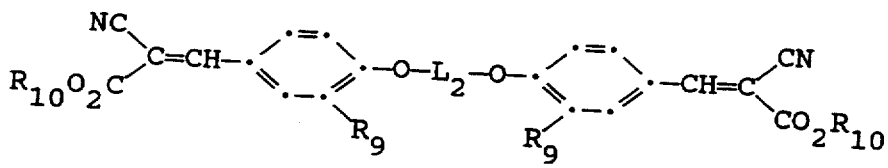

---

Signed and Sealed this

Twenty-third Day of January, 1996

Attest:

BRUCE LEHMAN

Attesting Officer        Commissioner of Patents and Trademarks